United States Patent [19]

Genest

[11] Patent Number: 4,506,116

[45] Date of Patent: Mar. 19, 1985

[54] SECURITY DIALING SYSTEM FOR LONG DISTANCE TELEPHONE SYSTEMS

[76] Inventor: Leonard J. Genest, 1061 Tropic La., Santa Ana, Calif. 92705

[21] Appl. No.: 514,395

[22] Filed: Jul. 18, 1983

[51] Int. Cl.³ .......................................... H04M 1/272
[52] U.S. Cl. ................................................. 179/90 BD
[58] Field of Search ........... 179/90 BD, 90 BB, 90 B, 179/90 K, 18 BA, 18 B, 99 M

[56] References Cited

U.S. PATENT DOCUMENTS 4,332,982  6/1982  Thomas ...................... 179/18 B X Primary Examiner—Stafford D. Schreyer
Attorney, Agent, or Firm—Nilsson, Robbins, Dalgarn, Berliner, Carson & Wurst

[57] ABSTRACT

An automatic dialing system (ADS) for Touch Tone single or multiple trunk telephone systems that allows access to long distance dialing services including the access phone number of the service and the individual access code. The ADS used in a multiple trunk system with several key type telephones may be connected in parallel to any one existing telephone in the system and will serve all the telephones in the system. The system consists of a microprocessor that performs all the logic timing and control for the system, a phase lock loop that provides a near square wave output only when a selected single frequency is present, a solid state dialer that outputs to the telephone trunk the preprogrammed touch tone dial tones, a programmable non-volatile electrically alterable memory which provides easy programming of the service access telephone number and the individual access code and trunk isolation transformers. The phase lock loop and processor determines if the proper two buttons on the telephone keypad are pressed to initiate the sequence. The phase lock loop sequentially scans the trunk lines via a solid state switch for each trunk until the processor recognizes the access tone at which time the sequencer is stopped and the ADS captures the trunk and begins automatic dialing of the stored numbers.

2 Claims, 2 Drawing Figures

SECURITY DIALING SYSTEM FOR LONG DISTANCE TELEPHONE SYSTEMS

BACKGROUND OF THE INVENTION

This invention relates to an automatic telephone dialing system for use in multiple trunk multikey Touch Tone telephone systems for accessing long distance telephone systems such as MCI or NPS while maintaining both the telephone number and the access code secret from the typical user.

The various long distance dialing services typically buy long distance time from the telephone company in large blocks at low rates then resell time to individual users at a lower rate than the telephone company. To access the service, first a typical seven digit local number is dialed to reach the service. The user then awaits a dial tone and then proceeds to dial an access code of typically five to seven digits followed by the three digit area code and the telephone number of the party to be called. A minimum of twenty two digits must be dialed. Also, the codes for the access to the long distance service must be published to those who operate the system. If the security of the code maintenance is breached, unauthorized persons may use the codes to access the long distance service.

In order to solve this problem, the telephone company has available speed dialing options. However the speed dialing option must be installed on each and every telephone in the system at a high installation cost and monthly use fee. Electronic telephone systems are also available that have a speed dialing feature but the cost of these systems far exceed the savings of a long distance dialing service.

To overcome the cost and installation problems of the current available speed dialing system, the present invention provides a novel dialing device that can be connected in parallel with any one telephone in a multiphone multitrunk touch tone installation by simply plugging it between any telephone instrument connector and the mating cable connector anywhere in the system. Then the ADS will function for all the telephones in the system. The ADS system then scans all the trunk lines in the system sequentially until a single 1477 hertz tone is detected for 300 milli-seconds without interruption which is produced by simultaneously pressing any two buttons in the right vertical column of the telephone key pad including the digit 3, 6, 9 and #. Upon detection of the proper tone, the ADS ceases scanning and locks on to the particular trunk line where the proper tone is present. Upon release of the two simultaneously held buttons, the ADS automatically dials the long distance telephone company access seven or eight digit telephone number. Upon pick up by the service, another dial tone is heard at which time the user again simultaneously presses the two proper keys on the telephone keypad. Upon release of the two simultaneously held buttons, the ADS automatically dials the access code of the long distance dialing service. The user may then dial the area code and the telephone number of the telephone being called.

Further, in accordance with the invention, the installation of the ADS can be easily installed by the user, can be easily programmed by the user, can be easily accessed by the user, provides security for the codes needed to access the long distance dialing service, is low cost, and can be retrofitted in any existing touch tone dialing system.

SUMMARY OF THE INVENTION

A typical system in which the present apparatus and method in accordance with the invention may be utilized includes a male-female parallel connector for connection between any telephone instrument in a telephone system and its mating cable connector, an internal panel for programming consisting of two pushbuttons and a single digit seven segment display, a phase lock loop to provide a uniform waveform when 1477 Hertz is received and a non-uniform waveform for all other input frequencies, a processor that assimilates the information from the phase lock loop and determines if the proper single tone 1477 Hertz frequency is present and further provides the timing and control signals needed for the trunk multiplex scanner and dial frequency generator.

In operation, the user begins accessing the long distance telephone service by lifting the telephone receiver and simultaneously pressing the # and the 9 on the telephone keypad for about two seconds. The basic system is set up to sequentially scan four trunk lines sampling each trunk for 100 milliseconds. If the phase lock loop and processor detect and determine that the single 1477 Hertz tone is continuously present, the processor will discontinue scanning and will monitor the selected trunk for a total of 300 milliseconds. If a full 300 milliseconds of uninterrupted 1477 Hertz tone is detected, the processor will initiate the first tone dialing sequence as soon as the user releases the # and the 9 that were simultaneously pressed on the telephone keypad by providing the dial frequency generator the proper commands. This first sequence will be the telephone number of the long distance service. As soon as the long distance service picks up the call at their end, a new dial tone is heard indicating to the user that the # and the 9 on the telephone keypad must again be pressed. The phase lock loop and the processor again detect the presence of the 1477 Hertz tone for 300 milliseconds and initiate the second automatic dialing sequence by providing the dial frequency generator the proper commands which is the access code for the long distance service. As soon as the access code sequence has been completed the processor causes the multiplex scanner to begin scanning the trunks and the user may enter the area code and telephone number of the telephone he is calling.

BRIEF DESCRIPTION OF THE DRAWINGS

A complete understanding of the present invention and of the above and other features and advantages thereof may be gained from a consideration of the following description of the preferred embodiments taken in conjunction with the accompanying drawings in which.

DETAILED DESCRIPTION

Figure 1:
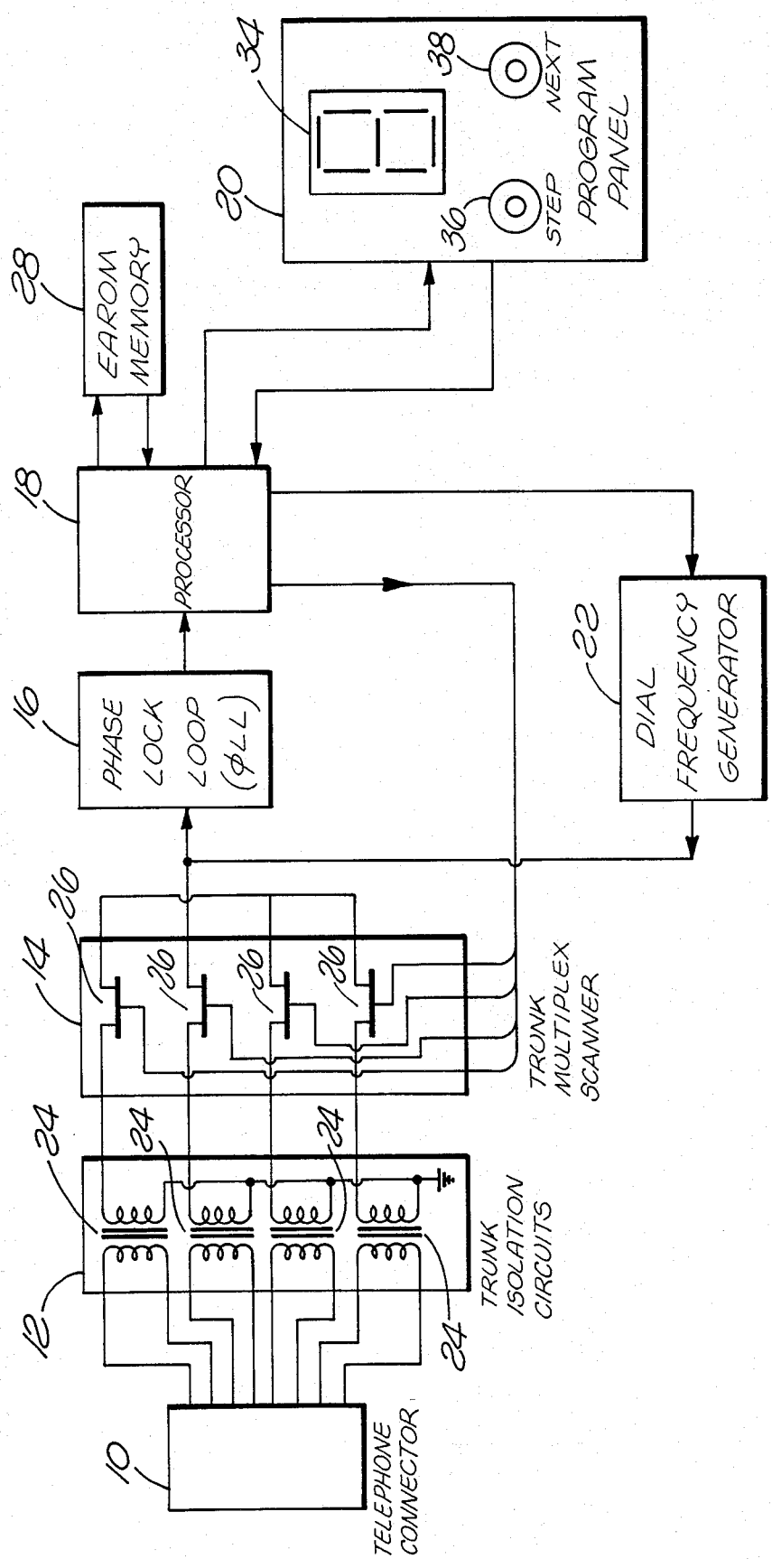
FIG. 1 is a block diagram of an automatic dialer device in accordance with the invention.

Referring to FIG. 1, a system which may be used in accordance with the present invention is illustrated as comprising a parallel male-female telephone type connector 10; a trunk isolator 12 which consist of one isolation transformer 24 for each trunk line to be scanned; a trunk multiplex scanner 14 which sequentially connects the secondary coil of each isolation transformer 24 to the phase lock loop 16 which is adjusted to provide a uniform pulse output that tracks the single frequency of 1477 Hertz but provides a non-continuous non-symetrical pulse output for all other frequencies and combination of frequencies. A microprocessor 18 provides all the operating logic for the system including the timing analysis of the phase lock loop 16 to determine if a continuous pulse output of 1477 Hertz is available from the phase lock loop 16. A dial frequency generator 22 is available as a monolithic device from one of several manufacturers such as the National Semiconductor produces the dialing tones required by the telephone system when the appropriate binary codes are presented to the dial frequency generator 22 by the processor 18. Finally, a program panel 20 provides a means whereby the operator may encode the long distance telephone service telephone number and private access code for storage by the processor 18 in a suitable memory 28.

Figure 2:
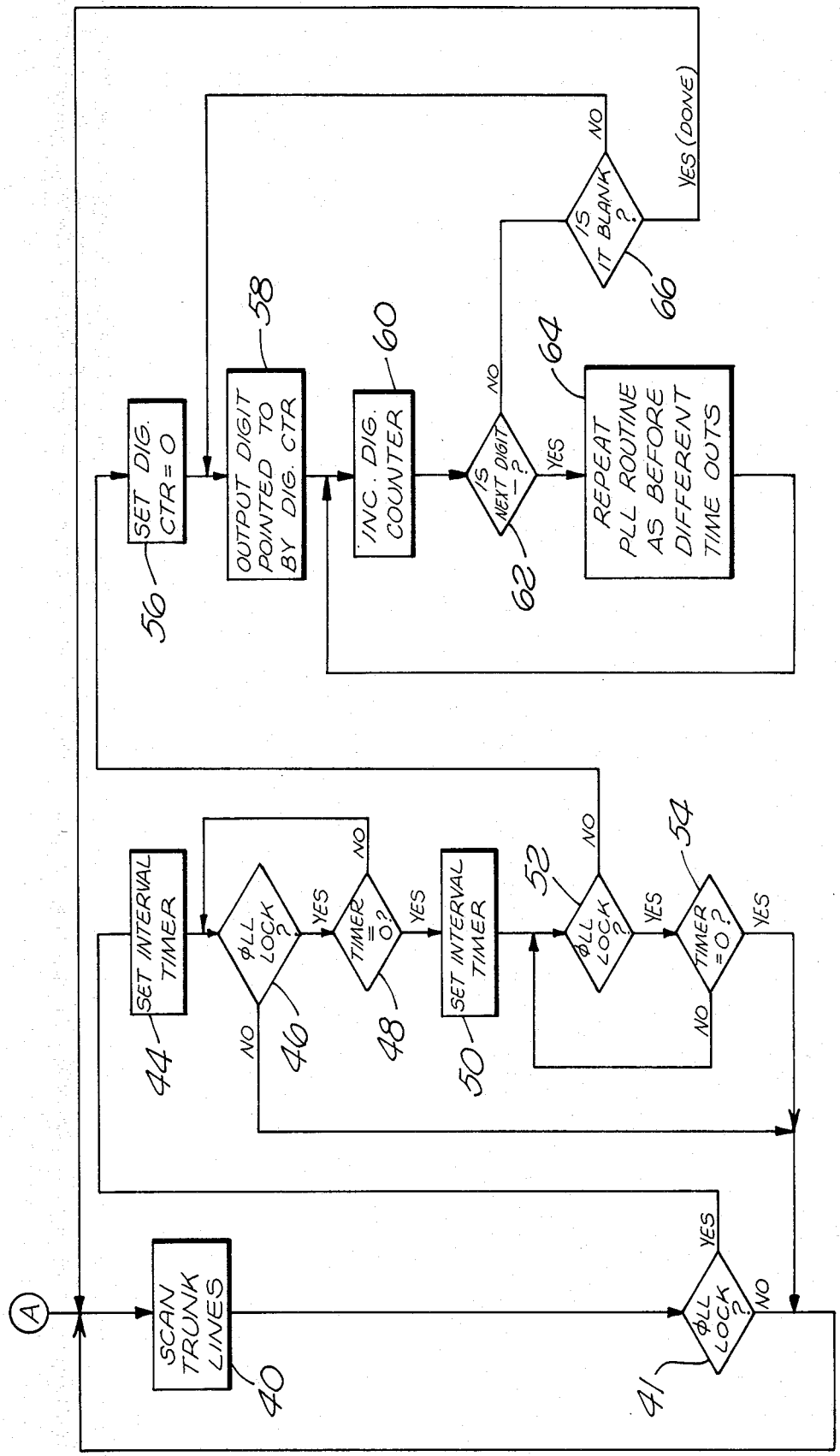
FIG. 2 is a flow diagram of the algorithm programmed in the processor to effect proper operation in sequencing of the automatic dialer in accordance with the invention.

Referring to FIG. 1 in conjunction with FIG. 2, the processor 18 is programmed to provide the logic control of the multiplex scanner 14 to cause the scanner 14 to sequentially connect a selected trunk isolation transformer 24 to the phase lock loop 16 for a period of time, typically 100 milliseconds (Block 40). If during the 100 millisecond time frame, the processor 18 detects a continuous noninterrupted pulse repetition rate of 1477 Hertz (Block 41), the processor 18 will hold the scanner 14 at its present position retaining the connection between the connected trunk isolation transformer 24 and the phase lock loop 16 for another period of time (Block 44) typically another 200 milliseconds.

If at any time during this timed period, the phase lock loop 16 loses lock for even one cycle, the processor 18 will detect that loss of lock by the phase lock loop 16 (Blocks 46-48) and will return to the sequential scanning of the trunk isolation transformers 24. If after a specified period, 200 milliseconds for purposes of this example, the phase lock loop 16 has maintained lock at 1477 Hertz, the processor 18 will again set an interval timer (Block 50) and will thereafter continue to look at the output of the phase lock loop 16 until the time on the interval timer has reached 0 (Blocks 52 and 54). If the phase block loop loses lock at any time during the time interval set by the interval timer 50 then the user will have released lock by terminating depression of the telephone buttons. If the user has not released the buttons within the time interval set in Block 50, the program will return to the trunk line scanning mode. If on the other hand the user has released the buttons within the time interval set by Block 50, the processor will begin to apply a binary sequence of digits to the inputs of the dial frequency generator 22 (Blocks 56-66).

In order to apply the binary sequences of digits to the inputs of the dial frequency generator 22, the processor may, for example, initially set a digit counter to zero (Block 56). Corresponding to that count is a telephone number digit stored in the memory 28. That digit is retrieved by the processor and is outputted to the dial frequency generator (Block 58). The digit counter is then incremented (Block 60) and the next digit tested to determine whether it is a dash (Block 62) or is blank (Block 66). If the next retrieved digit is neither a blank nor a dash, then the digit is again outputted and the digit counter again incremented (Blocks 58 and 60).

If the digit is a dash then that indicates that the first number sequence has been completed and the program is placed in an idle mode (Block 64) to wait for the operator to press the buttons again (PLL indicator lock). When the operator has pressed the buttons again the digit counter is again incremented (Block 60) whereupon the next digit is outputted to the dial frequency generator. Thereafter, if the counter is incremented and the digit is blank, then both digits (the access telephone number and the access code number) stored in the memory 28 will have been outputted to the dial frequency generator (Block 66).

The dial frequency generator 22 is a discreet or monolithic telephone dial tone generator that generates the dual tone frequencies for each dialed digit as required for proper telephone signaling in response to presentation to it of binary data on its code line inputs by the processor 18. The output of the dial frequency generator 22 is fed to the junction of the trunk multiplex scanner 14 and the phase lock loop 16. The dual tone generated by the dial frequency generator 22 is then connected through the trunk multiplex scanner 14 to the trunk isolation transformer 24 selected. The tones are then transferred through the appropriate trunk isolation transformer 24 to the telephone trunk line connector 10 to the telephone system where the telephone system will recognize said tones to be dialing or signaling tones.

The system herein which is the subject of this invention may be connected into any existing single or multi-trunk and multikey telephone system. It connects in parallel with any instrument in the system and services all the instruments in the system. It does this by scanning all the trunks in the system which in such telephone systems are present at each instrument. The only time that a 1477 Hertz continuous frequency can be available is when any two key buttons on a push button telephone are simultaneously pressed and held. For all single key dial activation, dual frequencies are generated. Speech which is also sampled by the phase lock loop 16 does not contain 300 milliseconds at 1477 Hertz with adequate consistency for recognition by the processor 18. Therefore, any time any telephone instrument anywhere in the system initiates a single tone as herein described, upon selection of that trunk by the multiplex scanner 14 and processor 18, the phase lock loop 16 and processor 18 will detect the single continuous tone of 1477 Hertz and initiate the dialing sequence by feeding the proper signals to the dial frequency generator 22.

Most long distance dialing services require two dialing sequences to be completed prior to dialing the actual area code and telephone number. The first dialing sequence is the telephone number of the service and the second dialing sequence is the user's code. The system herein is programmed with both sequences by program panel 20. The execution of each sequence is by pressing two telephone key buttons in the right vertical column such as the 9 and the #. The first sequence of operations upon capturing the trunk line by the trunk multiplex scanner 14 and the processor 18 has been described. Following the initiation of the first dialing sequence by the dial frequency generator 22 and the processor 18, the multiplex scanner 14 remains in the same trunk selection position awaiting another repeat of the single 1477 Hertz tone from the pressing of the 9 and the # on the telephone instrument. Upon receipt of this second tone through the trunk multiplex scanner 14 to the phase lock loop 17 and processor 18, the dial frequency generator 22 and processor 18 generate the dual tone dial frequency sequence that is the long distance service access code.

The processor 18 contains an electrically alterable read only memory 28 where the programmed telephone number and access code are stored. Due to the use of the EAROM 28, power failure will not cause a loss of program information. The program panel 20 and processor 18 are used to program numbers into the EAROM 28 in the same fashion as it would store any number in any part of its internal RAM memory.

The program panel 20 includes 1 single digit seven segment display 34 and two push buttons momentary switches 36 and 38. One switch 36 is labeled STEP and the second switch 38 is labeled NEXT. With the display digit 34 extinguished, the first pressing of the NEXT button 38 will cause the first digit of the dialing sequence to be programmed. The first digit displayed on the display 34 will be the current programmed number in memory for that digit location in the number group. The digit may be changed by pressing the STEP button 38 which will cause the digit displayed to advance one count every second from 0 thru 9 followed by a blank and a dash in continuous rotation until the STEP button 38 is released. The STEP button 36 may be released when the new digit desired to be programmed is displayed on the display 34. Each time the NEXT button 38 is pressed, the digit that was displayed on the display 34 is recorded into the EAROM 28 and the next digit in the dialing sequence is presented for viewing or change. During the STEP sequence the digits 0 thru 9 plus the dash and the blank are sequenced. At the end of the first dialing sequence of seven or eight digits, a dash is programmed as a deliniator to the processor 18 to indicate completion of the first number dialing sequence. After the dash, the second sequence of five to seven access code numerical digits are programmed followed by a blank to indicate to the processor 18 the completion of the entire dialing sequence. The processor 18 then resumes trunk scanning as previously described. Additionally, once the processor 18 determines that the 1477 Hertz tone is present signaling the start of a dialing sequence, the complete sequence of operations as herein described must be completed within a predetermined period of time or the processor 18 will abort the operation and release the selected trunk line by the trunk multiplex scanner 14 and continue scanning.

The logic and timing herein described involving the processor 18 could be replaced with discreet circuitry to achieve the same results.

What is claimed is:

1. An automatic dialing device for a trunk telephone system having at least one Touch Tone telephone, each comprising a multibutton dialer for generating tone signals in response to the depression of the dialer buttons, a telephone trunk having at least one trunk line interconnected to a telephone network and a signal line for coupling tone signals from each telephone to the telephone trunk, the automatic dialing device interconnected to the telephone trunk for automatically generating, for transmission on the telephone network through the telephone trunk, a first sequence of tone signals in response to a first single frequency tone signal caused by the simultaneous depression of two of the dialer buttons of one of the telephones interconnected to the telephone trunk, and thereafter automatically generating a second prestored sequence of tone signals in response to the generation of a second single frequency tone signal caused by the simultaneous depression of two of the dialer buttons, on one of the telephones interconnected to the telephone trunk, the automatic dialing device comprising:

a connector coupled in the telephone trunk to enable receipt of the first and second single frequency tone signals from one of the telephones interconnected to the telephone trunk and to enable injection of a sequence of tone signals from the automatic dialing device to the telephone network through the telephone trunk;

a trunk multiplex scanner coupled to the connector for repeatedly, sequentially and individually coupling each trunk line in the telephone trunk;

frequency detection means coupled to the trunk multiplex scanner for generating an output signal when one of the first and second single frequency tone signals exists on the coupled trunk line;

a processor coupled to the frequency detection means and the trunk multiplex scanner for receiving the output signal from the frequency detection means and terminating scanning of the trunk multiplex scanner for at least as long as the output signal is generated, retaining the connections between the trunk line on which the one of the first and second single frequency tone signals occurs, and enabling output of a first tone command sequence and a second tone command sequence upon termination of the first and second single frequency tone signals respectively if the output signal of the frequency detection means has persisted respectively for at least a first and second predefined period of time; and tone signal generator means coupled between the processor and the trunk multiplex scanner to receive the first and second tone command sequences from the processor and generate the first and second tone signal sequences in response to the respective first and second tone command sequence, the first and second tone signal sequences being coupled to the telephone trunk.

2. The automatic dialing device of claim 1 further comprising:

memory means coupled to the processor for storing the first and second tone command sequences, and a program panel coupled to the processor for encoding the memory means with the first and second tone command sequences.

* * * * *